United States Patent
Hicks et al.

(10) Patent No.: US 8,499,932 B2
(45) Date of Patent: Aug. 6, 2013

(54) SOFTWARE MEDIA PACKAGING APPARATUS

(75) Inventors: Timothy G. Hicks, Cedar Park, TX (US); Ciaran P. Harte, Clonsilla (IE)

(73) Assignee: National Instruments Corporation, Austin, TX (US)

(*) Notice: Subject to any disclaimer, the term of this patent is extended or adjusted under 35 U.S.C. 154(b) by 79 days.

(21) Appl. No.: 12/732,766

(22) Filed: Mar. 26, 2010

(65) Prior Publication Data
US 2011/0233081 A1   Sep. 29, 2011

(51) Int. Cl.
*B65D 85/57* (2006.01)

(52) U.S. Cl.
USPC ....... 206/312; 206/308.1; 229/92.8; 229/67.1

(58) Field of Classification Search
USPC .......... 206/308.1, 312, 311, 309, 45.2, 45.23, 206/45.24, 232; 229/71, 92.8; 40/124.12, 40/124.13, 124.14, 124.06, 710, 774, 777
See application file for complete search history.

(56) References Cited

U.S. PATENT DOCUMENTS

| | | | | |
|---|---|---|---|---|
| 1,666,957 A * | 4/1928 | Cather | | 229/72 |
| 1,815,396 A * | 7/1931 | Cather | | 229/72 |
| 3,522,908 A * | 8/1970 | Carrigan | | 229/72 |
| 4,307,806 A * | 12/1981 | Haubert | | 206/232 |
| 4,640,413 A * | 2/1987 | Kaplan et al. | | 206/232 |
| 4,658,955 A | 4/1987 | Eichner | | |
| 6,016,907 A * | 1/2000 | Dreier | | 206/232 |
| D426,417 S * | 6/2000 | Young | | D6/626 |
| 6,244,627 B1 | 6/2001 | Wolff et al. | | 281/29 |
| 6,491,160 B2 * | 12/2002 | Butler et al. | | 206/232 |
| 6,499,651 B2 * | 12/2002 | Gerrie et al. | | 229/67.1 |
| 6,505,737 B1 * | 1/2003 | Sherman | | 206/308.1 |
| D490,808 S * | 6/2004 | Khachikian | | D14/345 |
| 6,814,278 B2 * | 11/2004 | Gerrie et al. | | 229/67.1 |
| 6,837,371 B1 * | 1/2005 | Goetzke et al. | | 206/308.1 |
| 6,951,279 B2 * | 10/2005 | Hodess et al. | | 206/313 |
| 6,966,484 B2 | 11/2005 | Calonje et al. | | |
| 6,981,587 B2 | 1/2006 | Gerrie | | |
| 7,191,579 B2 * | 3/2007 | Bartholf et al. | | 53/460 |
| 7,721,943 B2 | 5/2010 | Perrone et al. | | |
| 7,798,392 B2 * | 9/2010 | Potter et al. | | 229/305 |
| 2001/0020593 A1 * | 9/2001 | Koehn | | 206/308.1 |
| 2002/0117410 A1 * | 8/2002 | Butler et al. | | 206/312 |
| 2003/0230626 A1 | 12/2003 | Rones | | |
| 2004/0206808 A1 | 10/2004 | Calonje et al. | | |
| 2005/0029135 A1 * | 2/2005 | Gerrie | | 206/312 |
| 2005/0224566 A1 * | 10/2005 | Butler | | 229/301 |
| 2005/0252801 A1 | 11/2005 | Buck | | |
| 2007/0080196 A1 | 4/2007 | Rosenkranz et al. | | |

* cited by examiner

*Primary Examiner* — J. Gregory Pickett
*Assistant Examiner* — Ernesto Grano
(74) *Attorney, Agent, or Firm* — Meyertons Hood Kivlin Kowert & Goetzel, P.C.; Jeffrey C. Hood

(57) ABSTRACT

Software media packaging apparatus and associated method for manufacturing. The software media packaging apparatus may include first and second panels. The first and second panels may be connected to each other on three edges to define an enclosure. A media storage flap may be attached to the second panel and may be adapted to hold one or more software media. The media storage flap may be perforated with one or more perforations. Each perforation may be adapted to hold a software medium. The media storage flap may be foldable across the second panel. First and second sealer flaps may be connected to at least two edges of the first panel. The first and second sealer flaps may be adapted to fold over and attach to the enclosure and the media storage flap, thereby holding the media storage flap adjacent to and substantially coplanar with the second panel.

8 Claims, 5 Drawing Sheets

SOFTWARE MEDIA PACKAGING APPARATUS

FIELD OF THE INVENTION

The present invention relates to an improved type of software packaging apparatus.

DESCRIPTION OF THE RELEVANT ART

Physical storage media, such as CD-ROMs, are commonly used as a means of distributing computer software. One common practice is to mail such software storage media from one location to another together with documentation for the software. For example, a computer software product might be purchased (e.g., by phone, online, or by any of various means) and mailed from a distribution center to the purchaser or a location of the purchaser's choosing.

Generally, in such cases, the packaging in which the software product is mailed is a box or a box-like apparatus. Such boxes are bulky and typically enclose a significant amount of empty space. In addition, sometimes material is included whose sole purpose is to fill the extra space and/or hold the software product securely within the box, in which it would otherwise be free to move in the empty space, and potentially be damaged. This bulky and excessive manner of packaging results in correspondingly expensive production, assembly, and shipping costs. Accordingly, a more economical means of packaging software products for transport, particularly one that is more space and/or weight efficient while also securing the software product(s) within the packaging, would be desirable.

SUMMARY OF THE INVENTION

Embodiments are presented of an improved type of software media packaging apparatus.

A first set of embodiments includes a software media packaging apparatus for transporting software media. The software media packaging apparatus may include a first panel which defines a first side of an enclosure and a second panel which defines a second side of the enclosure. The first panel and the second panel may be connected to each other on three edges to define the enclosure. The enclosure may be adapted to hold one or more documents; for example, in some embodiments, the enclosure may be adapted to hold unfolded letter and/or A4 sized documents. In some embodiments, one edge (e.g., an edge at which the first and second panels are not connected, e.g., a top edge) of the second panel may include a recess (or an indentation) adapted to allow for easy separation of the top of the second panel from a top of the first panel, to readily enable access to the interior of the enclosure.

The software media packaging apparatus may also include a media storage flap attached (e.g., a portion of the media storage flap may be fixedly attached) to the second panel and adapted to hold one or more software media. For example, the media storage flap may be perforated with one or more perforations, where each perforation is adapted to hold a software medium, such as a CD. The media storage flap may be foldable across the second panel to hold software media adjacent to and substantially coplanar with the second panel.

In addition, the software media packaging apparatus may include first and second sealer flaps connected to at least two edges of the first panel. The first and second sealer flaps may be adapted to fold over and attach to the enclosure and the media storage flap. The sealer flaps may hold the media storage flap adjacent to and substantially coplanar with the second panel when attached to the enclosure and the media storage flap. In some embodiments, the first and second sealer flaps may be connected to top and bottom edges of the first panel. In some embodiments, a third sealer flap may be connected to a third edge of the first panel. The third sealer flap may, like the first and second sealer flaps, be adapted to fold over and attach to the enclosure and the flap, and to hold the media storage flap adjacent to and substantially coplanar with the second panel when attached to the enclosure and the media storage flap. Alternatively, or in addition, one or more of the sealer maps may include one or more tabs adapted to fold laterally around the enclosure.

In some embodiments, one or more of the sealer flaps may include one or more adhesive strips, such that folding the first and second sealer flaps over the enclosure seals the media storage flap to the enclosure. In some embodiments, one or more of the sealer flaps may include one or more lines of perforation, e.g., for opening the software media packaging apparatus once it has been sealed. For example, in some embodiments, one or more of the sealer flaps may include a removable strip for opening the sealer flap and enabling access to contents in the enclosure.

In some embodiments, the media storage flap may have a width which approximates a width of a software medium. For example, the media storage flap may be greater than the width of a software medium, but may be sized to prevent substantial movement of the software media within the media storage flap when the media storage flap is held adjacent to the second panel by the first and second sealer flaps. In some embodiments, the type of software medium which the media storage flap is adapted to hold may be disc shaped, although other embodiments are also contemplated. The media storage flap may be attached to the second panel at a location on the second panel such that an outward edge of the media storage flap aligns with an edge of the second panel.

In some embodiments, since the software media flap seals adjacent to and substantially coplanar with the enclosure, the software media packaging apparatus may be configured for transmission through the mail as a standard flat envelope.

A second set of embodiments includes a blank adapted to be shaped into a software media packaging apparatus. A third set of embodiments includes a method for manufacturing a software media packaging apparatus. The method for manufacturing a software media packaging apparatus may include creating the blank adapted to be shaped into a software media packaging apparatus. The blank may include a first panel having parallel first and second longitudinal edges and parallel first and second latitudinal edges. The longitudinal edges and the latitudinal edges may be substantially perpendicular. The blank may also include second, third, fourth, and fifth panels, as well as first and second sealer flaps. The second panel may be connected to the first panel at the first longitudinal edge. The third panel may be connected to the first panel at the second longitudinal edge. The fourth panel may be connected to the third panel at a third longitudinal edge The fifth panel may be connected to the fourth panel at a fourth longitudinal edge. The first sealer flap may be connected to the first panel at the first latitudinal edge. The second sealer flap may be connected to the first panel at the second latitudinal edge.

The second and third panels may be folded across the first panel in an overlapping manner to form an enclosure. The fourth and fifth panels may be folded together to form a media storage flap. The media storage flap so formed may be folded across the enclosure to hold software media in the media storage flap adjacent to and substantially coplanar with the enclosure. The first and second sealer flaps may be folded over and attached to the enclosure and the media storage flap, thereby holding the media storage flap adjacent to and substantially coplanar with the enclosure.

The method for manufacturing a software media packaging apparatus may thus produce a software media packaging apparatus such as described in the first set of embodiments, and the blank adapted to be shaped into a software media packaging apparatus may correspondingly have some or all of the features described with respect to the software media packaging apparatus in relation to the first set of embodiments. It should be noted, however, that the software media packaging apparatus described in relation to the first set of embodiments may alternatively be produced from a different type of blank (or other starting material) and/or using a different method than described in the second and third set of embodiments. In other words, the blank and the method described with respect to the second and third set of embodiments should not be considered as limitations to the first set of embodiments.

The software media packaging apparatus described herein may provide an improved means of packaging software media for transport. Because the software media packaging apparatus may be substantially flat (both prior to use, e.g., in storage, and after contents have been inserted and the software media packaging apparatus has been sealed, e.g., for transport), the software media packaging apparatus described herein is more space-efficient, and potentially more weight-efficient, than box-type software media packages. Furthermore, because extraneous space is essentially eliminated, and because of the unique design of the media storage flap, the software media may be held more securely in the software media packaging apparatus described herein than in other types of packaging. In addition, beyond the likelihood that the software media packaging apparatus described herein will be more weight-efficient than box-type software media packages, it may typically cost less to ship than a box type software media package simply because the software media packaging apparatus is substantially flat; for example, such a software media packaging apparatus as described herein may in some embodiments qualify for a reduced shipping rate as a standard flat envelope, or another reduced shipping rate.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Figure 5A:
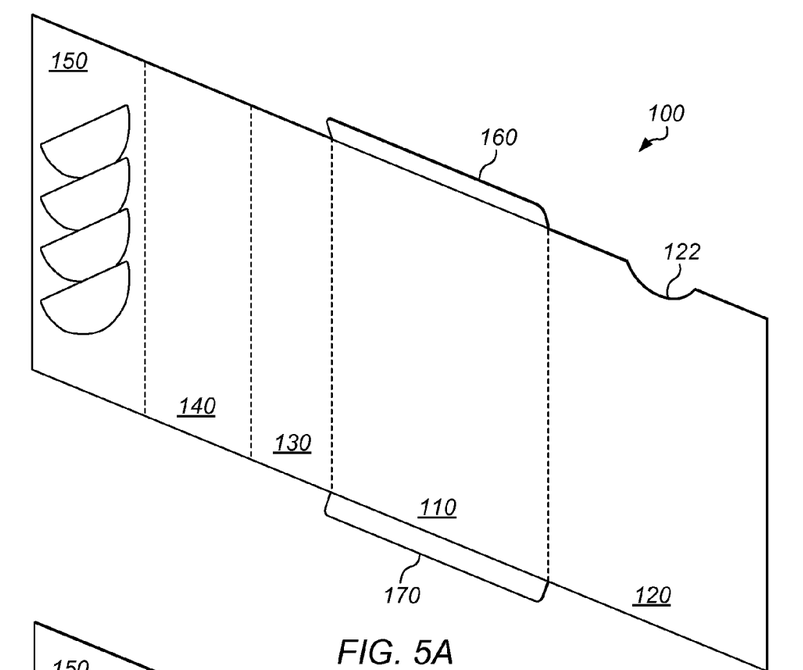
FIGS. 5A-5F depict, in perspective view, a sequence of steps by which a software media packaging apparatus may be assembled from a blank and sealed according to one embodiment.
Figure 5B:
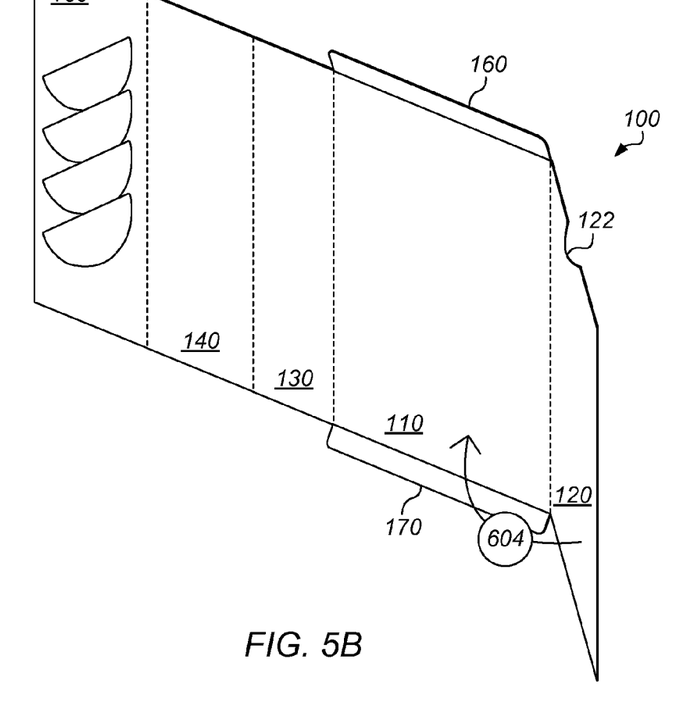
Figure 5C:
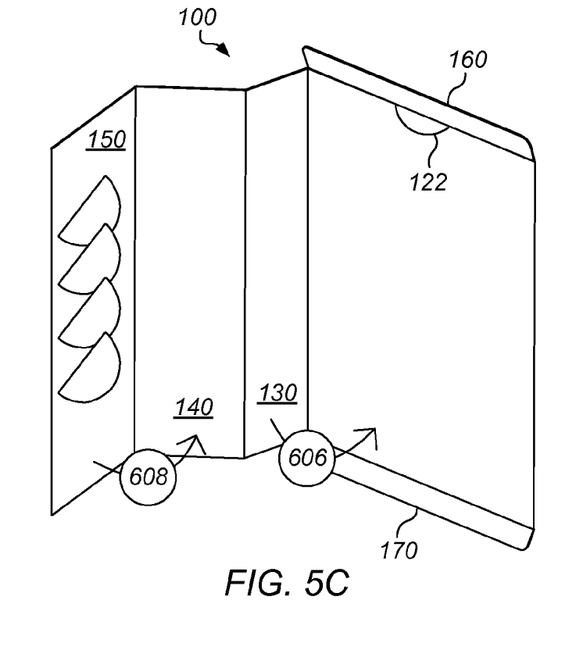
Figure 5D:
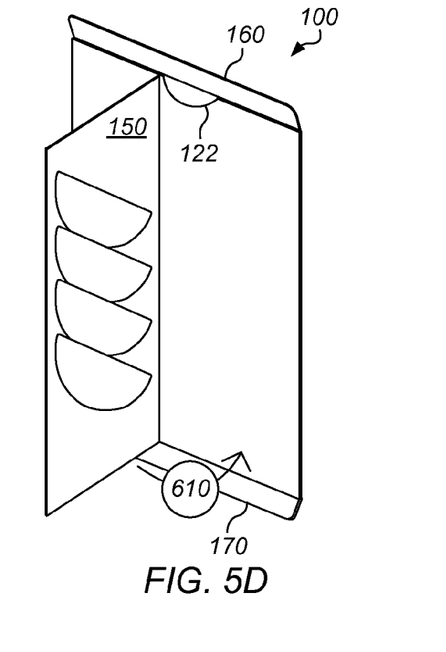
Figure 5E:
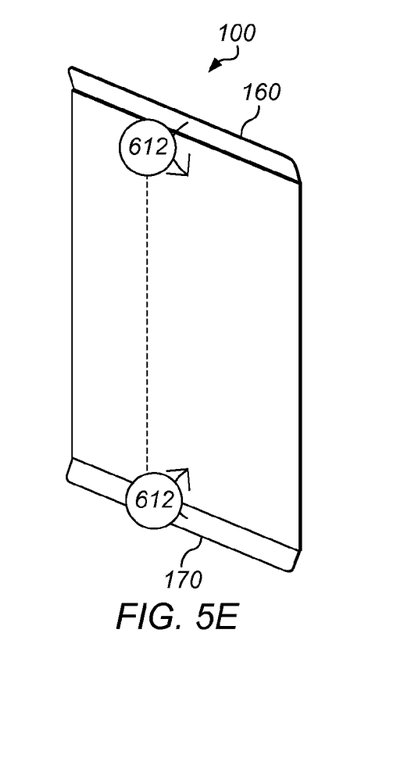
Figure 5F:
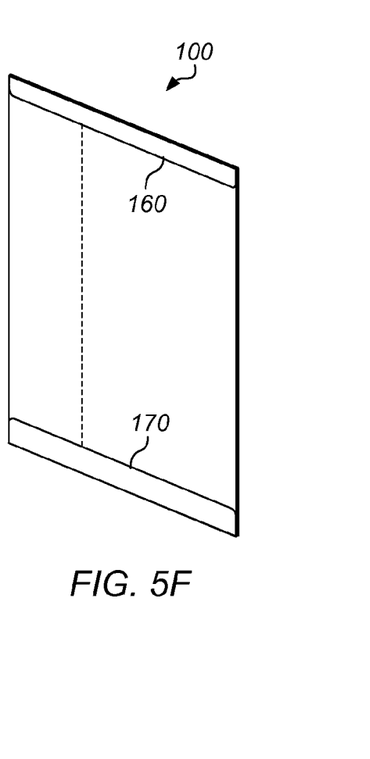
Figure 6:
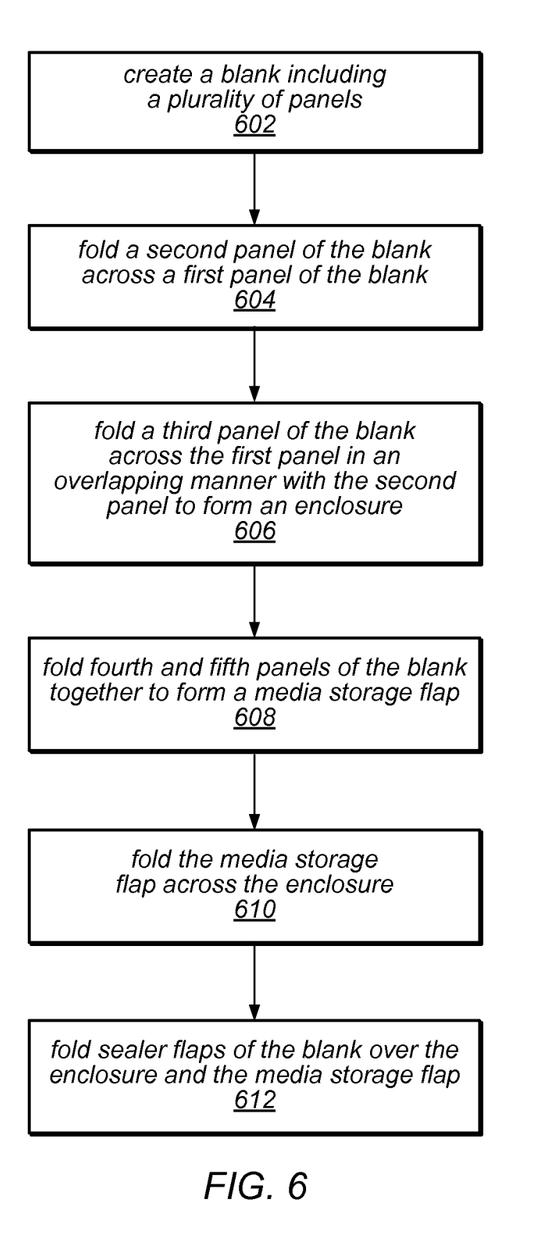
FIG. 6 is a flowchart illustrating a method for manufacturing a software media packaging apparatus according to one embodiment.

The present invention relates to an improved type of software media packaging apparatus, as shown according to various embodiments in FIGS. 1-5, and which may be manufactured according to a method illustrated by the flowchart shown in FIG. 6. The software media packaging apparatus may be used to package software media along with documentation for the software media for transport.

Figure 1:
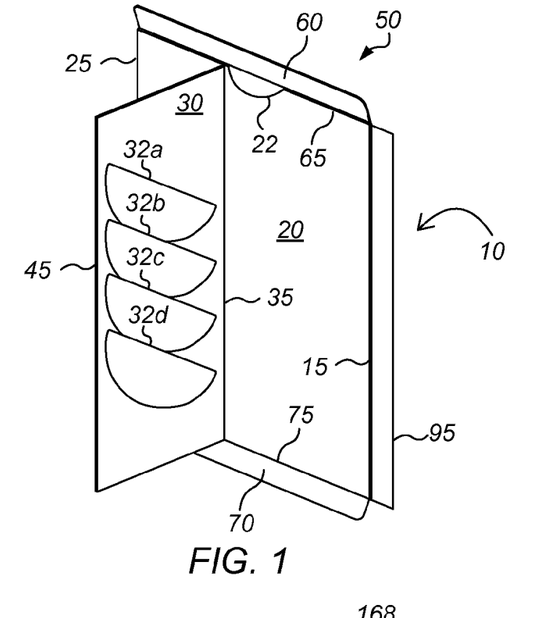
FIG. 1 depicts a software media packaging apparatus according to one embodiment.
Figure 2:
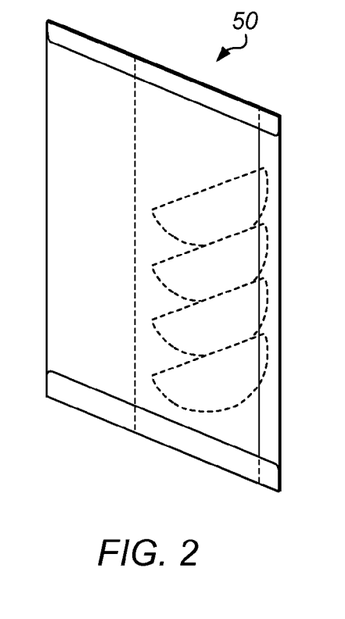
FIG. 2 depicts a sealed software media packaging apparatus according to one embodiment.
Figure 3:
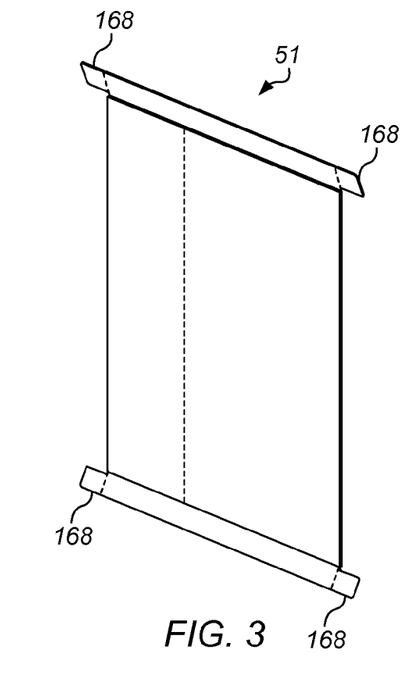
FIG. 3 depicts an alternate embodiment of a software media packaging apparatus.

FIGS. 1-3—Software Media Packaging Apparatus

FIG. 1 illustrates a software media packaging apparatus 50 according to one embodiment. The apparatus may include a first panel 10 defining a first side of an enclosure and a second panel 20 defining a second, opposite side of the enclosure. The first panel 10 and the second panel 20 may be connected to each other on three edges to define the enclosure. For example, the first panel 10 and the second panel 20 may be connected along bottom edge 75 and right and left edges 15 and 25, in some embodiments. In this case, the first panel 10 and the second panel 20 may be unconnected along the top edge 65. The first panel 10 and the second panel 20 may be substantially rectangular, and the enclosure formed by the first panel 10 and the second panel 20 may thus also be substantially rectangular. In some embodiments, at least two of the edges (e.g., right and left edges 15 and 25) may be gusseted, e.g., to enable the enclosure to expand in thickness. This may, for example, allow more and/or thicker documents to comfortably fit inside of the enclosure.

In some embodiments, the second panel 20 may include an indentation or a recess 22. The recess 22 may allow easy separation of an edge (e.g., the top edge) of the second panel 20 from an edge (e.g., the top edge) of the first panel 10 to enable access to the interior of the enclosure. In other words, the recess 22 may allow the two panels 10, 20 to be opened easily, so that documents or other contents may be placed inside of the enclosure or removed from the enclosure.

The enclosure may in some embodiments be sized appropriately for a specific size of document. For example, the enclosure may be an appropriate size to hold unfolded letter and/or A4 sized documents, or ledger and/or A3 sized documents. These are examples only, and it will of course be recognized that the enclosure could be adapted to hold documents of any of a great variety of sizes, including documents sized according to any of the ISO 216 paper size standards, North American paper sizes (including ANSI defined paper sizes), architectural paper sizes, and/or other paper sizes.

In addition to the enclosure defined by the first panel 10 and the second panel 20, the software media packaging apparatus may also include a media storage flap 30. The media storage flap 30 may be adapted to hold one or more software media. For example, the media storage flap may be perforated with one or more perforations 32. In some embodiments, there may be multiple perforations 32 such that the media storage flap 30 may hold multiple software media; for example, as shown in FIG. 1, there may be four perforations 32a-d. However, this may not be necessary; embodiments are also envisioned in which the media storage flap 30 may be adapted to hold a single software medium, or any other number of software media, if desired.

The media storage flap 30 may be connected to the second panel 20. In some embodiments, the media storage flap 30 may be connected to the second panel 20 along one edge 35 of the media storage flap 30, such that the media storage flap 30 may be rotated about the edge 35. Thus, the media storage flap 30 may be folded down across the second panel 20 such that the media storage flap 30 (and any software media held therein) is substantially coplanar with the second panel 20 (as shown in FIG. 2), or may be folded up away from the second panel 20 to provide access to the one or more perforations 32 and any software media held in the one or more perforations 32 (as shown in FIG. 1).

With respect to the perforations 32, each perforation 32 may be a partial perforation (e.g., a partially cut slot) or may be a full perforation (e.g., a fully cut slot), as desired. In embodiments which include multiple perforations, a combination of partial and full perforations is also contemplated. For example, a first perforation could be a full perforation, into which a first software medium could be placed, while each additional perforation could be only partially cut (e.g., partial perforations). This way, if only the first software medium is to be held, it will be clear to a recipient of the apparatus that the other perforations did not at one time hold additional software media that might have been lost in transit, but if there are additional software media to be held, additional software media sized slots can be easily created from the partial perforations.

The software media flap 30 may in some embodiments be adapted to hold a specific type of software media. For example, the software media flap 30 may be adapted to hold compact discs, e.g., CD-ROMs, or digital versatile discs (DVDs), as shown in the figures; alternatively, or in addition, the software media flap 30 may be adapted to hold any of various other types software media, if desired.

The software media flap 30 may have a width which approximates a width of the software media which it is adapted to hold. For example, the software media flap 30 may have a width which is wide enough that the software media may fit within it (e.g., the software media flap 30 may be wider than the software media), but narrow enough that the software media are held relatively snugly by the software media flap. For example, the software media flap 30 may have a width such that when a software medium is placed in a perforation 32 in the software media flap 30 (i.e., when the software medium is held by the software media flap 30) and the software media flap 30 is held adjacent to the second panel 20 (e.g., as it would be during transport), the software medium is substantially prevented from moving within the software media flap.

In some embodiments, the media storage flap 30 may be attached to the second panel 20 at a location on the second panel 20 such that an outward edge of the media storage flap 30 aligns with an edge (e.g., edge 15) of the second panel 20. In other words, when the media storage flap 30 is folded across the second panel 20 such that the media storage flap 30 and the second panel 20 are coplanar, the outward edge 45 of the media storage flap 30 may line up with an edge (e.g., edge 15) of the second panel 20, such as shown in FIG. 2. It will be noted, of course, that in some embodiments, the width of the software media flap 30 may be less than the width of the enclosure, such as shown in FIGS. 1 and 2. For example, this may be the case if the enclosure is sized to hold letter and/or A4 sized documents, and the software media flap 30 is sized to hold compact discs. In this case, the edge 35 along which the software media flap 30 connects to the second panel 20 may not align with an edge of the second panel 20. However, embodiments are also contemplated in which the edge 35 along which the media storage flap 30 connects to the second panel 25 may align with an edge (e.g., edge 25) of the second panel 20. In this case the outward edge 45 of the media storage flap 30 may or may not align with an edge (e.g., edge 15) of the second panel 20 when coplanar therewith.

The software media packaging apparatus may further include sealer flaps for attaching the software media flap 30 to the enclosure. For example, as shown in FIG. 1, there may be a first sealer flap 60 attached to a top edge 65 of the first panel 10, and a second sealer flap 70 attached to a bottom edge 75 of the first panel 10. The sealer flaps may alternatively be connected to different edges of the first panel 10 according to various embodiments; for example, embodiments are also contemplated in which the second sealer flap is attached to the right (as shown in FIG. 1) edge 15 of the enclosure. Additionally, embodiments are contemplated in which there is a third sealer flap for further security in sealing the software media flap 30 to the enclosure. For example, there could be first and second sealer flaps 60, 70 as shown in FIG. 1, and additionally a third sealer flap 95 attached to the right (as shown in FIG. 1) edge 15 of the enclosure. Alternatively (or in addition), embodiments are contemplated in which one or more of the sealer flaps include one or more tabs 168 adapted to fold around (e.g., laterally around) the enclosure, such as shown on the alternate embodiment of a software media packaging apparatus 51 in FIG. 3, for further security in sealing the software media flap 30 to the enclosure.

As noted above, the sealer flaps may be adapted to attach the software media flap 30 to the enclosure. For example, once the software media flap 30 has been folded across the second panel 20 such that it is adjacent to and substantially coplanar with the second flap 20, the sealer flaps may be folded over the enclosure and the flap and attached thereto, thereby sealing the software media flap 30 adjacent to and substantially coplanar with the second flap 20. One or more of the sealer flaps may in some embodiments include an adhesive means for easy attachment to the media storage flap 30 and the second panel 20, such as one or more adhesive strips.

The software media packaging apparatus 50 may also include a means for easily opening the package once it has been sealed. For example, in some embodiments, the sealer flaps may also be perforated, allowing for easy access to the contents of a sealed software media packaging apparatus 50. In these embodiments, one or more of the sealer flaps may be perforated along one or more lines of perforation. In one set of embodiments, one or more sealer flaps may be perforated with a single line of perforation, along which such sealer flaps may be opened (e.g., torn) by a person without need for a tool such as scissors or a knife. In another set of embodiments, one or more sealer flaps may be perforated with two substantially parallel lines of perforation, forming a removable strip, which may for example be easily removed (e.g., without need for a tool such as scissors or a knife) by a person in order to gain access to the contents of the enclosure.

Figure 4:
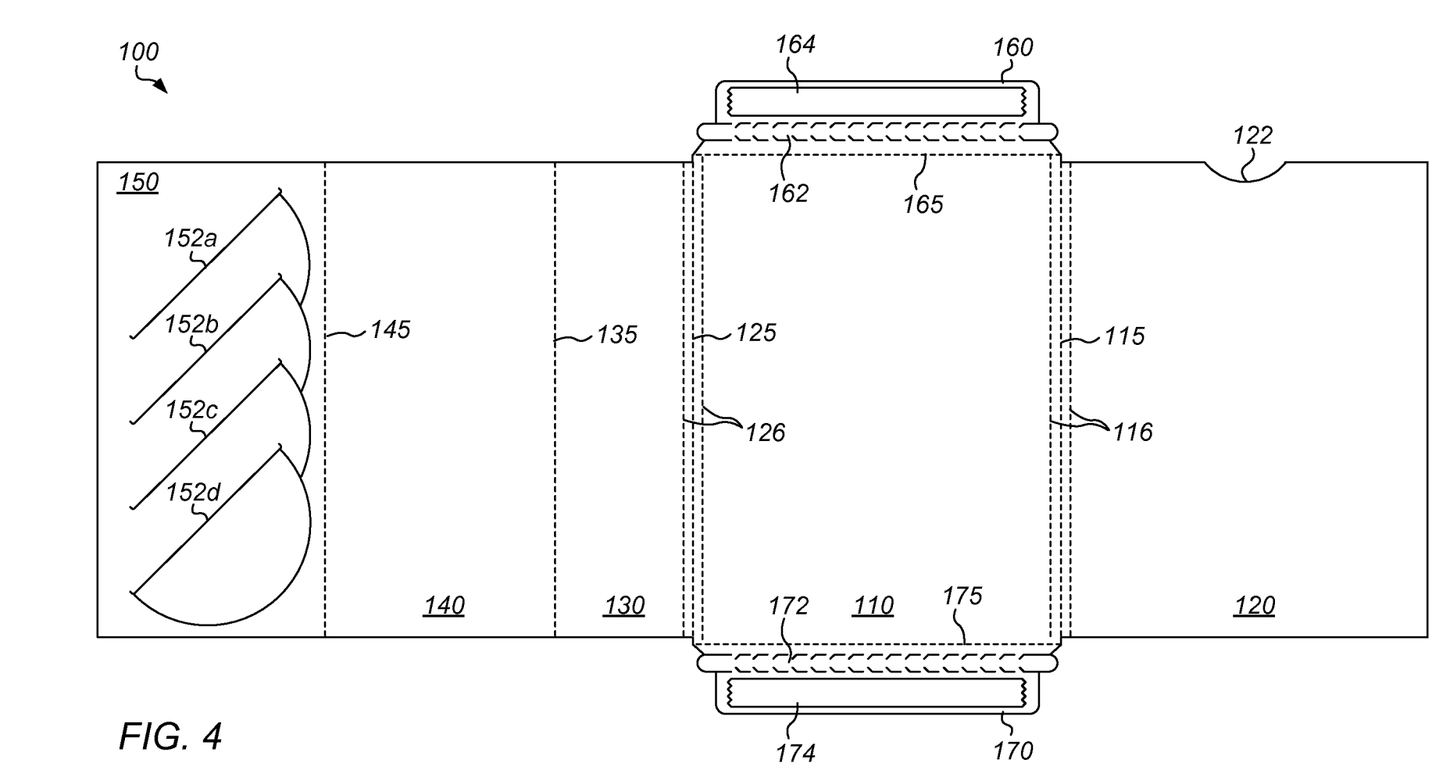
FIG. 4 depicts a blank adapted to be shaped into a software media packaging apparatus according to one embodiment.

The above described software media packaging apparatus may be formed in any of a variety of ways. For example, the software media packaging apparatus may be assembled from a variety of discrete portions. Thus, in one embodiment, a discrete first panel 10, second panel 20, and media storage flap 30 might be attached to each other by an adhesive means or other means of attachment to form the software media packaging apparatus, if desired. Alternatively, in some embodiments, the software media packaging apparatus may be formed from a single unitary member (e.g., a blank) adapted to be shaped into the software media packaging apparatus. For example, a blank which is shaped to include a plurality of panels which may be folded together (and in some embodiments made to adhere to one another in an assembled state) to form the software media packaging apparatus may be used, if desired. FIGS. 4-6 illustrate an exemplary blank adapted to be shaped into a software media packaging apparatus and a method for manufacturing a software media packaging apparatus therefrom according to one embodiment.

FIGS. 4-6—Blank Adapted to be Shaped into a Software Media Packaging Apparatus

FIG. 4 is an overhead view of a blank 100 that is adapted to be shaped into a software media packaging apparatus (such as software media packaging apparatus 50 shown in FIGS. 1 and 2) according to one embodiment. FIG. 5A shows a perspective view of the blank 100, and FIGS. 5B-5F show, in perspective view, a series of steps that could be taken to shape the blank 100 into a software media packaging apparatus according to one embodiment. FIG. 6 is a flowchart diagram illustrating a method for manufacturing a software media packaging apparatus utilizing such a blank. In various embodiments, some of the method elements shown may be performed concurrently, in a different order than shown, or may be omitted. Additional method elements may also be performed as desired. As shown, this method may operate as follows.

In 602, a blank may be created. The blank may be formed by a die cut or another suitable means, and may be made of cardboard, card stock, envelope stock, or any other suitable material, as desired.

The blank may be comprised of a plurality of panels adapted to be folded (and in some embodiments sealed) together to form the software media packaging apparatus. As noted above, FIG. 4 illustrates an exemplary blank suited for this purpose. As shown, the blank may include a first panel 110, a second panel 120, a third panel 130, a fourth panel 140, a fifth panel 150, a first sealer flap 160, and a second sealer flap 170.

The first panel 110, which may be rectangular, may be considered as having parallel first and second latitudinal edges 165 and 175, and parallel first and second longitudinal edges 115 and 125, where each latitudinal edges is perpendicular to the longitudinal edges and vice versa. The first panel 110 and the second panel 120 may be connected along the first longitudinal edge 115. The first panel 110 and the third panel 130 may be connected along the second longitudinal edge 125. The fourth panel 140 may connect to the third panel 130 at a third longitudinal edge 135, which may form an opposite edge of the third panel 130 relative to second longitudinal edge 125. The fifth panel 150 in turn may connect to the fourth panel 140 at a fourth longitudinal edge 145, which may form an opposite edge of the fourth panel 140 relative to the third longitudinal edge 135.

As shown, the first panel 110 may also connect to the first sealer flap 160 at the first latitudinal edge 165, and may connect to the second sealer flap 170 at the second latitudinal edge 175. The sealer flaps 160, 170 may include one or more lines of perforation 162, 172 and/or adhesive strips 164, 174, similar to those described above with respect to FIGS. 1-3, in some embodiments.

In 604, the second panel 120 may be folded across the first panel 110. This step is illustrated according to one embodiment in FIG. 5B. In 606, the third panel may be folded across the first panel. This step is illustrated according to one embodiment in FIG. 5C. The second and third panels 120, 130 may thus be folded over the first panel 110 in an overlapping manner to form an enclosure. In some embodiments, the second and third panels 120, 130 may be attached to each other and/or to the first panel such that the enclosure is partially sealed together. For example, the second and third panels 120, 130 may be attached together (e.g., adhesively) to form a face (e.g., comparable to the second panel 20 of software media packaging apparatus 50 shown in FIGS. 1 and 2) of the enclosure opposite to the first panel 110, which may also be attached (e.g., adhesively) to the first panel 110 along either a bottom or a top edge, thereby sealing the enclosure along three edges.

In some embodiments at least two edges of the enclosure may be gusseted. For example, the second panel 120 may connect to the first panel 110 at the first longitudinal edge 115 in such a way as to form a first gusset 116, while the third panel 130 may connect to the first panel 110 at the second longitudinal edge 125 in such a way as to form a second gusset 126. The gussets may allow for an expansion in thickness of the enclosure formed by folding the second and third panels across the first panel. The possibility of expansion provided by the gussets may thus allow the enclosure to equally conveniently hold relatively few or no documents, a middling number of documents, or a relatively large number of documents, as desired.

As shown in FIGS. 4 and 5, in some embodiments the second panel 120 may include a recess or indentation 122. This indentation 122 may serve a similar purpose as indentation or recess 22 of software media packaging apparatus 50 shown in FIGS. 1-2; that is, the indentation 122 may be adapted such that it will be located on an unsealed edge of the enclosure formed by folding second and third panels across the first panel; thus, the indentation 122 may be used in order to easily separate the first panel 110 and the second panel 120 and thereby gain access to the inside of the enclosure.

In 608, the fourth panel 140 and fifth panel 150 may be folded together to form a media storage flap. This step is illustrated according to one embodiment in FIG. 5C. As shown, in some embodiments the fifth panel may include one or more perforations. It should be noted, however, that the fourth panel may alternatively include the one or more perforations, if desired. The media storage flap formed by folding together the fourth and fifth panels 140, 150 may be adapted to hold one or more software media. In some embodiments, the fourth and fifth panels 140, 150 may also be attached together in such a folded state; for example, the fourth and fifth panels 140, 150 may be made to adhere to one another at one or more locations, e.g., with glue or other adhesive means. The media storage flap so formed may operate in a similar manner (e.g., in terms of its perforations, width, software media holding capacity, and relation to the enclosure) as the media storage flap 30 described above with respect to FIGS. 1-2.

After step 608, the blank may be considered as assembled into a software media packaging apparatus. For example, the software media packaging apparatus shown in FIG. 5D may be comparable to the software media packaging apparatus 50 shown in FIG. 1. At this point the software media packaging apparatus may optionally be made to hold one or more software media and/or one or more documents; for example, one or more software media may be inserted into one or more of the perforations of the media storage flap, and/or one or more documents may be inserted into the enclosure. Once any desired software media and/or documents have been inserted into the software media packaging apparatus, steps 610 and 612 may be taken in order to seal the software media packaging apparatus, e.g., so that it is ready to be transported.

In 610, the media storage flap may be folded across the enclosure. This step is illustrated in FIG. 5D according to one embodiment. The media storage flap may be folded across the enclosure in such a manner that the software media flap and any software media held therein are held adjacent to and substantially coplanar with the enclosure.

In 612, the sealer flaps 160, 170 may be folded over the enclosure and the media storage flap. This step is illustrated in FIG. 5E according to one embodiment. As previously noted, one or more of the sealer flaps may include one or more adhesive strips 164, 174, by which means the sealer flaps may adhesively attach to the enclosure and the media storage flap. Alternatively, the sealer flaps may be attached to the enclosure and the media storage flap by manually applying adhesive to the sealer flaps and/or the enclosure and/or media storage flap before folding the sealer flaps over the enclosure and the media storage flap, or in any other manner, as desired.

Once the media storage flap has been sealed against the enclosure by the sealer flaps, the sealed software media packaging apparatus may appear substantially as shown in FIG. 5F, in some embodiments. The software media packaging apparatus may be substantially flat and may thus in some embodiments be suitably configured for transmission through the mail as a flat envelope. This may result in a less expensive shipping cost relative to bulkier box-type packaging apparatuses. In addition, the software media packaging apparatus described herein may include numerous other benefits, such as reduced manufacturing costs, more efficient use of storage space, and a more secure means of holding software media during transport, and numerous other benefits, as will be apparent to those of skill in the art.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A software media packaging apparatus for transporting software media, comprising:
   a first panel which defines a first side of a first enclosure;
   second and third panels which define a second side of the first enclosure, wherein the second and third panels are folded over the first panel in an overlapping and coplanar manner and attached together such that the first, second, and third panels forming the first enclosure are substantially coplanar,
   wherein the first panel is connected to the second panel along a first folding line, the first panel is connected to the third panel along a second folding line, and the first and second sides of the first enclosure are attached together along a basal edge, such that the first side of the first enclosure and the second side of the first enclosure are connected to each other on three edges to define the first enclosure, wherein the first enclosure has a length and a width which approximates a length and a width of unfolded letter sized documents;
   a media storage flap attached to the third panel along a third folding line which is not aligned with either outer edge of the first enclosure, the media storage flap comprising two panels attached together to form a second enclosure adapted to hold one or more software media, wherein the media storage flap is perforated with a plurality of perforations, wherein each of the plurality of perforations is adapted to hold a software medium, wherein the media storage flap is foldable across the third panel along the folding line to hold software media adjacent to and substantially coplanar with the first enclosure, wherein the media storage flap has a width which approximated a width of a CD-ROM, wherein the width of the media storage flap is less than the width of the first enclosure; and
   first and second sealer flaps connected to at least two edges of the first enclosure, wherein the first and second sealer flaps are adapted to fold over and attach to the first enclosure and the media storage flap, wherein the first and second sealer flaps are configured to hold the media storage flap adjacent to and substantially coplanar with the first enclosure when attached to the first enclosure and the media storage flap.

2. The software media packaging apparatus of claim 1, wherein the media storage flap is sized to prevent substantial movement of the software media within the media storage flap when the media storage flap is held adjacent to the first enclosure by the first and second sealer flaps.

3. The software media packaging apparatus of claim 1, wherein the software media packaging apparatus is configured for transmission through the mail as a standard flat envelope.

4. The software media packaging apparatus of claim 1, wherein at least one of the first and second sealer flaps comprises a removable strip for opening the sealer flap and enabling access to contents in the first enclosure.

5. The software media packaging apparatus of claim 1, wherein the first and second sealer flaps are connected to top and bottom edges of the first enclosure.

6. The software media packaging apparatus of claim 1, further comprising
   a third sealer flap connected to a third edge of the first panel,
   wherein the third sealer flap is adapted to fold over and attach to the first enclosure and the media storage flap, wherein the third sealer flap is configured to hold the media storage flap adjacent to and substantially coplanar with the first enclosure when attached to the first enclosure and the media storage flap.

7. The software media packaging apparatus of claim 1, wherein the media storage flap is attached to the third panel at a location on the third panel such that an outward edge of the media storage flap aligns with an edge of the first enclosure.

8. The software media packaging apparatus of claim 1, wherein the media storage flap is adapted to hold one or more CD-ROMs.

\* \* \* \* \*

UNITED STATES PATENT AND TRADEMARK OFFICE
CERTIFICATE OF CORRECTION

PATENT NO.         : 8,499,932 B2
APPLICATION NO.    : 12/732766
DATED              : August 6, 2013
INVENTOR(S)        : Hicks et al.

Page 1 of 1

It is certified that error appears in the above-identified patent and that said Letters Patent is hereby corrected as shown below:

In the Claims:

Claim 1, Column 10, Line 9, please delete "approximated" and substitute -- approximates --.

Signed and Sealed this
Fifteenth Day of October, 2013

Teresa Stanek Rea
*Deputy Director of the United States Patent and Trademark Office*